May 10, 1949.　　　　K. KERR ET AL　　　　2,469,506
FOLDING WHEEL TRAILER

Filed Feb. 23, 1946　　　　　　　　　　　　3 Sheets-Sheet 1

INVENTORS
KINGDON KERR
MALTE SWENSSON
BY C. G. Stratton
ATTORNEY

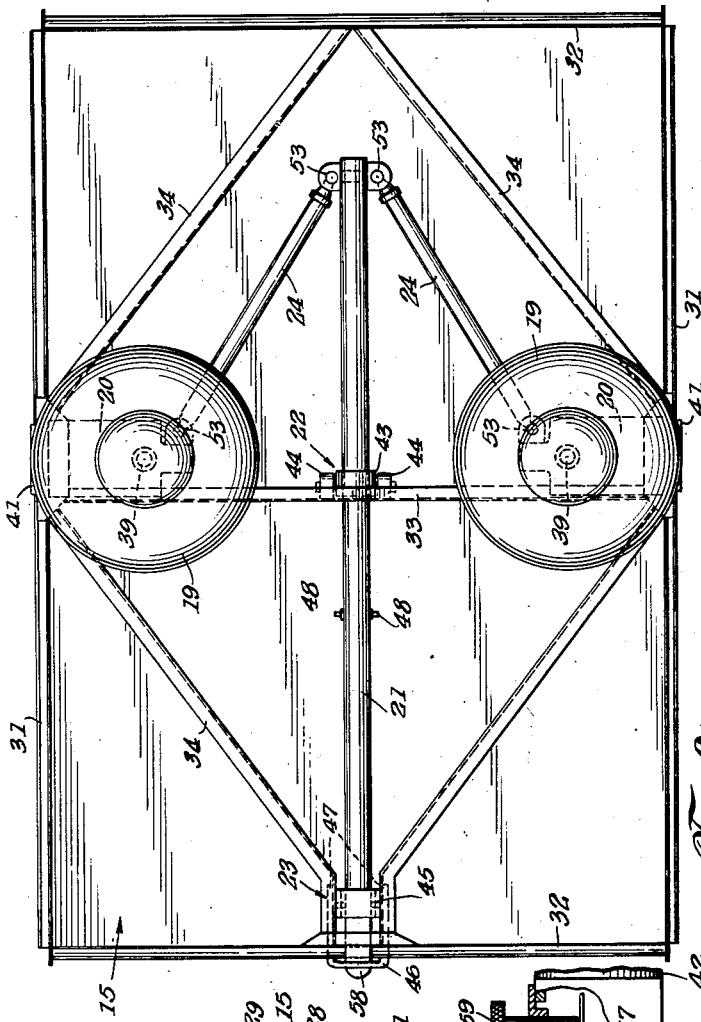

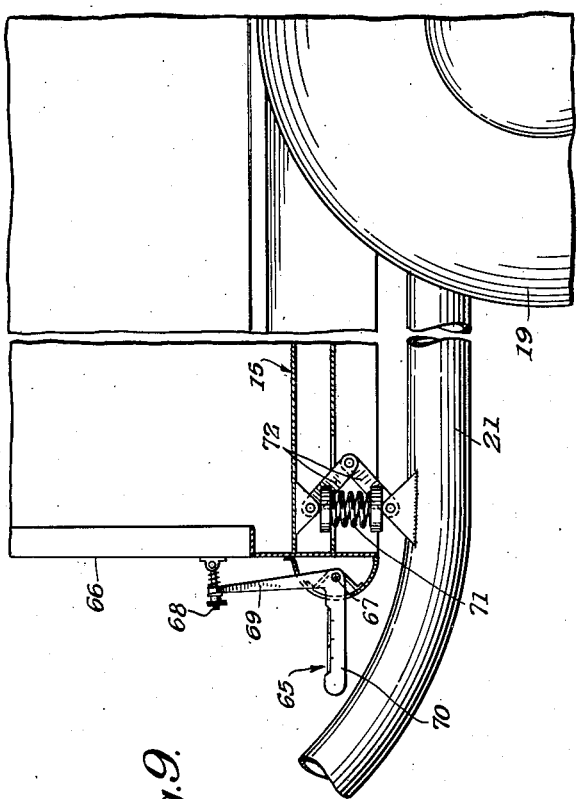
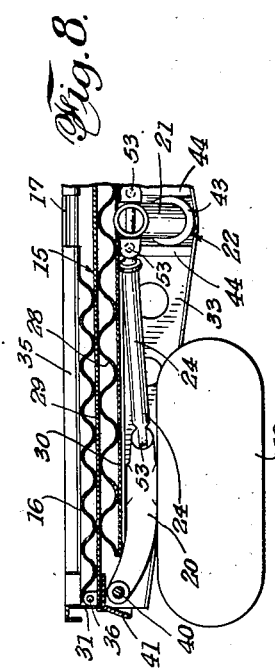
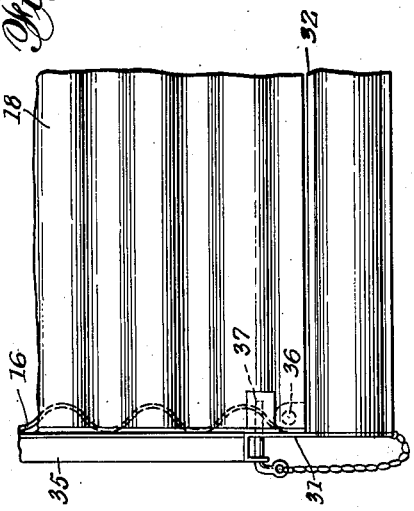
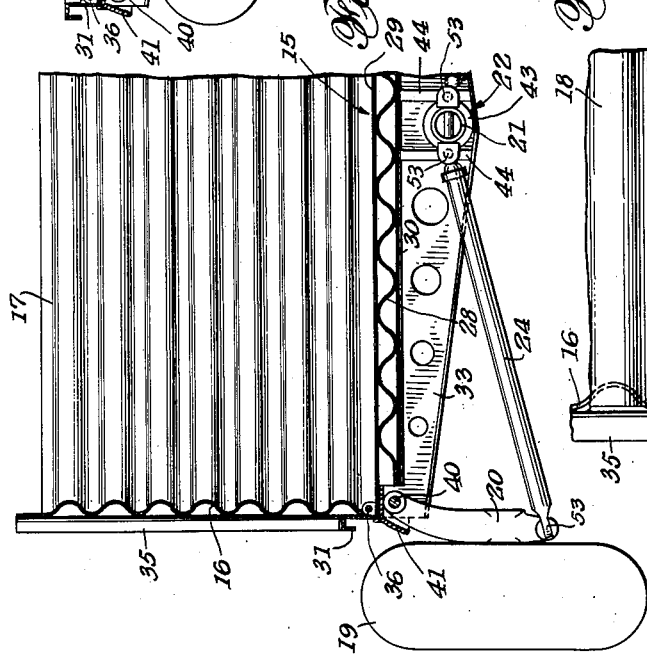
INVENTORS
KINGDON KERR
MALTE SWENSSON
BY C. G. Stratton
ATTORNEY Patented May 10, 1949

2,469,506

UNITED STATES PATENT OFFICE 2,469,506

FOLDING WHEEL TRAILER

Kingdon Kerr, Los Angeles, and Malte Swensson,
West Los Angeles, Calif.

Application February 23, 1946, Serial No. 649,523

6 Claims. (Cl. 280—33.4)

1

This invention relates to trailers, hand trucks and the like, and has for its primary object to provide a foldable, compact and easily transportable trailer of novel design and construction.

Another object of the present invention is to provide a trailer embodying means for indicating the loading balance of the trailer when in use, said means being so arranged with respect to the rear springs of a touring vehicle as to indicate the loading of the trailer without placing undue strains upon said car springs whereby said vehicle may be safely driven. It is also an object of our invention to provide means to avoid overloading the bumper or other part of such vehicle to which the trailer is attached.

Another object of the invention is to provide a trailer adapted to be folded or collapsed into a flat and compact form and wherein the normally extending hitch bar is retracted, one of the wheels of the folded trailer serving as means for rolling it to a desired storing place.

Another object of the invention is to provide a trailer having foldable side walls and end gates for flat inward folding, for easy removal of the tail gate and for outward folding of the front gate whereby loading of the trailer is facilitated from either the sides or the ends, and whereby articles of greater length than the trailer can be readily carried.

Another object of the invention is to provide a trailer adapted to be folded into a flat compact form with its wheels arranged in aligned side-by-side relation adapting said trailer to be easily mounted upon the top of a vehicle such as a passenger automobile, the wheel tires serving as cushions absorbing shocks transmitted from the trailer to the automobile body.

Another object of the invention is to provide a trailer in which the wheels are mechanically connected with the hitch and to each other whereby shocks incurred on one wheel will be transmitted to the other and to the hitch for general distribution to the trailer body and thereby obviating bouncing of the trailer on the road and permitting smooth yet restricted side sway.

Another object of the invention is to provide a trailer incorporating a body relatively tiltable about the wheels thereof and embodying suitably positioned means for indicating the leveling condition of the trailer under variable loads.

Our invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes embodiments of the present invention, which are given by way of illustration or example only.

In the drawings, like reference characters designate similar parts in the several views.

Fig. 1 is a longitudinal sectional view of a trailer according to the present invention, and shown hitched to be towed by a passenger automobile.

Fig. 2 is a top plan view to a reduced scale of the trailer when folded.

Fig. 3 is a bottom plan view of the folded trailer to the scale of Fig. 1.

Fig. 4 is a side view of the trailer as shown in Fig. 3.

Fig. 5 is an enlarged fragmentary sectional view of the front of the trailer in open condition.

Fig. 6 is a further enlarged partial side and partial sectional view of level indicating means employed in the invention.

Fig. 7 is a broken transverse sectional view of the trailer in open condition.

Fig. 8 is a similar view of the trailer in folded condition.

Fig. 9 is a fragmentary front end view of the open trailer.

Fig. 10 is a broken side view, partially in section, illustrating a modified form of the invention.

The trailer which is illustrated in the drawings comprises, generally, a body bed or bottom 15, inwardly foldable sides 16, an inwardly and outwardly foldable front gate 17, an inwardly foldable and removable tail gate 18, a pair of support wheels 19, a hinged or swinging arm 20 for connecting each wheel and the body bed 15, a hitch bar 21, a guide 22 for the hitch bar at a middle point of the trailer body, a combined guide and latch 23 for the hitch bar at the front end of the body, rods or drag links 24 connecting the hitch bar and each hinged arm 20 whereby endwise movement of the hitch bar moves said wheels between open and folded positions, level indicating means 25, and means 26 for connecting the hitch bar to a vehicle 27.

The trailer bed 15, as shown, comprises a corrugated metal floor 28 provided with a top flat metal floor sheet 29 and, if desired, a similar bottom sheet 30. The side edges of the bed may comprise relatively deep longitudinal structural members 31. The end edges may comprise angle or channel members 32.

The bed 15, which is in effect a chassis, may be reinforced as by stiffening members applied to the bottom thereof. As shown, said members may comprise a transverse channel 33 and suitably and angularly disposed channels 34.

Each side 16 also comprises a corrugated wall extending from front to rear of the bed 15 and having a suitably top curved edge. Each side is preferably of a height somewhat less than half the width of the bed whereby they may be folded inwardly toward each other as best seen in Fig. 2, so as to be flat upon the bed 15. Stiffening members 35 extend vertically from top to bottom of each side wall 16 which are pivotally carried on pivots 36 at the front and rear of the bed.

The front gate 17, also corrugated, is provided with side pivots 37 set higher than the pivots 36 so that the gate 17 can be folded over the folded sides 16, as shown in Fig. 2. The gate 17 can also be outwardly folded as shown in Fig. 1, so that the trailer can load elongated articles or can be used for sleeping purposes.

The tail gate 18 is similar to the front gate but it is somewhat shorter and is also carried on pivots 38 for inward folding. As shown in Fig. 2, the members 35 are so located as to provide a nest for the gates 17 and 18 and detent means may be provided for holding said gates in folded position until erection thereof is desired. Detent or latch means may also be provided for the trailer walls when erected.

The wheels 19 are generally connectional and located on both sides of a medial portion of the trailer chassis. Said wheels are each mounted on an axle 39 carried by each arm 20. The latter are sturdy members each mounted on a pivot 40 in a fitting 41 secured to the chassis 15 and to the respective members 31 thereof. The wheels are mounted as shown and described to pivot from a vertical position as in Fig. 7, to a horizontal position as in Fig. 8. In the latter position the wheels reside entirely beneath the bed 15.

The hitch bar 21 comprises a preferably tubular member formed with an offset 42. Said bar is guided for longitudinal movement in the guides 22 and 23, the former comprising a pivoted collar 43 carried by spaced bars 44 mounted in the channel 33. The combined guide and latch 23 comprises an oversize yoke or collar 45 through which the hitch bar extends, a latch lever 46 pivoted at 47 to the collar 45, and transverse pins 48 on the hitch bar and engageable by the latch lever when said pins reside in flared notches 49 formed in the collar 45. It will be seen that when the hitch bar is moved longitudinally forward, the pins 48 will enter the notches 49 and simultaneously lift the latch lever by engaging its cam faces 50. As the pins 48 bottom on the notches 49, the lever will drop so that its generally half round seats 51 will engage said pins to retain the hitch bar in extended position. The free end of the lever 46 is provided with an automatic spring clip 52 which engages about the hitch bar to hold the lever down in detent or latching position. When in such latched position, rearward thrusts on the hitch bar end 42 tend to hold the latch lever 46 all the tighter in its latching position, because rearward movement of the pins 48 tends to move the lever 46 in a counterclockwise direction, as shown in Fig. 5. By lifting manually on the free end of the lever 46, the hitch bar is freed to be retracted rearwardly.

The rearward end of the hitch bar 21 is connected to the free end of each arm 20 by means of the rods 24. A torque-free universal connection 53, at each end of said rods, effects easy pivotal movement of said arms by the mentioned longitudinal movement of the hitch bar. Thus, when the hitch bar is retracted as shown in Figs. 3, 4 and 8, the wheels are caused to lie flat against the bottom of the trailer bed, and when said hitch bar is extended forwardly outward, the wheels are positioned at right angles to the flat position as in Figs. 1 and 7.

Inasmuch as the hitch bar is effectively locked in extended position by the means 23, the extended wheels are held in proper position for supporting the trailer. Any road shock on one of said wheels is effectively transmitted through the hitch bar and the rods 24 to the other wheel and to the trailer to be absorbed thereby. The locking means 23 in the hitch bar permits the trailer to sway without transmitting this movement to the towing vehicle because the rearward lower portion of the hitch bar may twist angularly with respect to the forward higher portion of said hitch bar.

The level indicating means may be placed at any desired position on the trailer. As shown, said means is effectively positioned in the front end of the hitch bar immediately to the rear of the hitch 26. The means 25 preferably comprises a bubble level 54 cemented at 55 in a cradle 56 carried by a spring arm 57 in a manner to obviate strain on the cement 55. The spring arm 57 is rigidly mounted in a housing 58 and its position is adjustable by a screw 59 to bring the bubble 60 in the level to a desired position with respect to a scale or index marks 61.

After the trailer is hitched to a towing vehicle 27, as shown in Fig. 1, the means 25 is adjusted to indicate the level unloaded position of the trailer. Should the loading indicate an unbalancing of the trailer forward or aft with respect to the wheels 19, the loading distribution can be changed. This will restore the bubble to level position and assure a balanced loaded trailer. This feature is of importance since an unbalanced trailer load will affect the normal action of the springs of the towing vehicle 27 deleteriously affecting bumper supports and maneuverability thereof.

The modified construction of Fig. 10 embodies a level indicator combined with a load control spring. In this instance, the level indicator 65 is carried by the trailer body 66 and is adjustable in relation thereto as on a pivot 67 by means 68 engaging an arm 69 of the bubble level housing 70. The load control spring 71 is mounted between the body 66 and the hitch bar 21 so that variable loading of the trailer will tilt said body relatively to the hitch bar and affect the reading of the indicator 65. Forward over-loading will merely compress said spring but aft over-loading may unduly extend it. Safety links 72, therefore, may be provided to prevent such undue extension of the spring 71, and by their closed or collapsed position and by their elongated position, the links 72 may also act as a balance indicator in the absence of a bubble indicator.

From the foregoing it will be apparent that a trailer has been provided having many features combining to obtain an efficient and practical structure. When folded the trailer is compact for easy shipment and can easily be rolled away to a place of storage on one of its folded wheels. Side loading of the trailer is facilitated since either side wall may be folded down to obviate a high lift for articles being placed on the trailer bed. As seen in Fig. 9, the tail gate 18 may be readily removed by extracting one of the hinge pins 37 which is retained captive. The change of condition between open to folded position is effected merely by a push or pull on the hitch bar.

While we have illustrated and described what we now regard as the preferred embodiments of our invention, the constructions are, of course, subject to modification without departing from the spirit and scope of our invention. We, therefore, do not wish to restrict ourselves to the particular forms of construction illustrated and described, but desire to avail ourselves of all modifications that may fall within the scope of the appended claims.

Having thus described our invention, what we claim and desire to secure by Letters Patent is:

1. In a trailer, a chassis, a hitch bar, means on the underside of said chassis for guiding longitudinal movement of said hitch bar with respect to the chassis, a pair of spaced normally parallel support wheels for the chassis, oppositely-disposed arms pivotally connected to the underside of said chassis and having axles for journaling said wheels, rods connecting the arms and the hitch bar for moving said wheels about the pivots of the arms by longitudinally moving the hitch bar, said rods having universal connection pivots with the hitch bar and the arms, and a lock interconnecting said hitch bar at its forward end and the chassis to provide said hitch bar with angularly torsional properties for receiving road shocks transmitted thereto by said wheels.

2. In a trailer, a chassis including ground wheel means foldable up toward and within the perimeter of the underside of the chassis in an inoperative position, a hitch bar slidable longitudinally of the chassis, means connecting the hitch bar with the wheel means and arranged to effect said folding movement of the wheel means by the longitudinal movement of the hitch bar, and releasable latch means arranged when in a locking position to increasingly resist longitudinal movement of the hitch bar when force is applied to such bar in a direction to fold up the wheel means, and the wheels being connected to be folded up toward the chassis when the latch means is released from its locking position.

3. In a trailer, a rigid frame comprising a chassis, a pair of mounting wheels on opposite sides of said chassis, a member carrying each wheel and pivotally mounted on each side of the chassis for movement between a chassis-supporting position and a folded position against the underside of the chassis, a hitch bar, spaced means on the underside of the chassis for guiding the hitch bar between a projected position in which one end extends forward of the chassis and a retracted position wherein said hitch bar resides substantially entirely beneath the chassis and a link universally pivoted to the free end of each wheel-carrying member and having universal pivotal connection with the hitch bar whereby movement of said hitch bar from projected to retracted position will move the wheels from chassis-supporting to folded position and whereby projection from retracted position of the hitch bar will move the wheels back to chassis-supporting position.

4. In a trailer, a rigid frame comprising a chassis, a pair of mounting wheels on opposite sides of said chassis, a member carrying each wheel and pivotally mounted on each side of the chassis for movement between a chassis-supporting position and a folded position against the underside of the chassis, a hitch bar, spaced means on the underside of the chassis for guiding the hitch bar between a projected position in which one end extends forward of the chassis and a retracted position wherein said hitch bar resides substantially entirely beneath the chassis, means releasably interlocking the chassis and hitch bar when the latter is in projected position, and a link universally pivoted to the free end of each wheel-carrying member and having universal pivotal connection with the hitch bar whereby movement of said hitch bar from projected to retracted position will move the wheels from chassis-supporting to folded position and whereby projection from retracted position of the hitch bar will move the wheels back to chassis-supporting position.

5. In a trailer, a chassis, arms disposed on opposite sides of the chassis and provided with axles, wheels journaled on said axles, a hinge for each arm connecting the same to the chassis, a hitch bar arranged between and parallel to said hinges, spaced guides carried by the chassis for guiding the hitch bar for longitudinal movement, and a link connecting said hitch bar and each arm adjacent the axle thereof whereby one end position of the hitch bar, positions the links to hold the arms substantially perpendicular to the chassis and the wheels in chassis-supporting position, and whereby the other end position of the hitch bar positions said links to hold the arms substantially parallel to the chassis and the wheels in folded position beneath the chassis.

6. In a trailer, a rigid and generally rectangular horizontal frame comprising a chassis, an arm mounted at each of the opposite sides of said frame to swing between a position perpendicular to the frame and a position substantially parallel thereto, a hitch bar guided for movement longitudinally of the frame centrally between said arms, a link universally pivotally connected at one end to each arm adjacent the free end thereof, a fitting at one end of the hitch bar and effecting universal connection with the other end of each link whereby longitudinal movement of the hitch bar is translated by said links into pivotal movement of the arms, and a wheel mounted for free rotation on each arm adjacent the link connection therewith, said wheels being movable with the arms between a perpendicular position relative to the chassis and a relative parallel position within the perimeter of said chassis.

KINGDON KERR.
MALTE SWENSSON.

REFERENCES CITED

The following references are of record in the file of this patent:

UNITED STATES PATENTS

| Number | Name | Date |
| --- | --- | --- |
| 410,963 | Ellis | Sept. 10, 1889 |
| 426,593 | Kelly | Apr. 29, 1890 |
| 483,038 | Begley | Sept. 20, 1892 |
| 669,222 | Ruher | Mar. 5, 1901 |
| 863,972 | Ehlers | Aug. 20, 1907 |
| 995,566 | Rasmussen | June 20, 1911 |

(Other references on following page)

UNITED STATES PATENTS

| Number | Name | Date |
|---|---|---|
| 1,128,333 | Krna | Feb. 16, 1915 |
| 1,159,746 | Clark | Nov. 9, 1915 |
| 1,313,451 | Behlen | Aug. 19, 1919 |
| 1,471,548 | Clement | Oct. 23, 1923 |
| 1,482,146 | Pomilio | Jan. 29, 1924 |
| 1,513,717 | Mills | Oct. 28, 1924 |
| 1,716,736 | Reilly | June 11, 1929 |
| 1,835,436 | Shaw | Dec. 8, 1931 |
| 1,978,759 | Phelps | Oct. 30, 1934 |
| 2,018,527 | Kerr | Oct. 22, 1935 |
| 2,110,944 | Schultz | Mar. 15, 1938 |
| 2,123,615 | Small | July 12, 1938 |
| 2,142,749 | Graves | Jan. 3, 1939 |
| 2,272,870 | McEvoy | Feb. 10, 1942 |
| 2,396,576 | Kelly | Mar. 12, 1946 |

FOREIGN PATENTS

| Number | Country | Date |
|---|---|---|
| 486,748 | Great Britain | June 8, 1938 |